United States Patent
Imai (10) Patent No.: US 9,112,388 B2
(45) Date of Patent: Aug. 18, 2015

(54) MOTOR

(71) Applicant: KABUSHIKI KAISHA YASKAWA DENKI, Kitakyushu-shi (JP)

(72) Inventor: Tatsuya Imai, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/312,695

(22) Filed: Jun. 24, 2014

(65) Prior Publication Data

US 2014/0300229 A1 Oct. 9, 2014

Related U.S. Application Data

(63) Continuation of application No. PCT/JP2011/080199, filed on Dec. 27, 2011.

(51) Int. Cl.
H02K 7/102 (2006.01)

(52) U.S. Cl.
CPC ............ *H02K 7/1023* (2013.01); *H02K 7/1025* (2013.01)

(58) Field of Classification Search
CPC ........................... H02K 7/102; H02K 7/10253
USPC .......................................... 310/76, 77, 89, 43
See application file for complete search history.

(56) References Cited

U.S. PATENT DOCUMENTS

| | | | | |
|---|---|---|---|---|
| 4,142,610 A | * | 3/1979 | Alexander et al. | 188/71.9 |
| 6,459,182 B1 | * | 10/2002 | Pfann et al. | 310/77 |
| 8,091,691 B2 | * | 1/2012 | Qu et al. | 188/171 |
| 8,227,948 B1 | * | 7/2012 | Fox et al. | 310/89 |

FOREIGN PATENT DOCUMENTS

| | | |
|---|---|---|
| JP | 06-021392 U | 3/1994 |
| JP | 2008-236996 | 10/2008 |
| JP | 2011-190918 | 9/2011 |

OTHER PUBLICATIONS

International Search Report for corresponding International Application No. PCT/JP2011/080199 Jan. 31, 2012.
Written Opinion for corresponding International Application No. PCT/JP2011/080199 Jan. 31, 2012.

* cited by examiner

*Primary Examiner* — Dang Le
(74) *Attorney, Agent, or Firm* — Mori & Ward, LLP (57) ABSTRACT

This disclosure discloses a motor including a motor body unit configured to output rotation power, a brake unit fixed to a housing of the motor body unit with a bolt, and a collar. The collar is arranged between the motor body unit and the brake unit, and in which the bolt is inserted. The collar forms a space between the housing of the motor body unit and a fixing member of the brake unit. The collar is fixed with its end portion being inserted into at least one of the housing and the fixing member.

13 Claims, 8 Drawing Sheets

FIG. 1

FIG. 2 (COMPARATIVE EXAMPLE)

MOTOR

CROSS-REFERENCE TO RELATED APPLICATION

This is a continuation application PCT/JP2011/080199, filed Dec. 27, 2011, which was published under PCT article 21(2) in English.

FIELD OF THE INVENTION

The disclosed embodiment relates to a motor having a brake.

DESCRIPTION OF THE RELATED ART

A motor having a brake holding a rotary shaft is known.

SUMMARY OF THE INVENTION

According to one aspect of the disclosure, there is provided a motor including a motor body unit configured to output rotation power, a brake unit fixed to a housing of the motor body unit with a bolt, and a collar. The collar is arranged between the motor body unit and the brake unit, and in which the bolt is inserted. The collar forms a space between the housing of the motor body unit and a fixing member of the brake unit. The collar is fixed with its end portion being inserted into at least one of the housing and the fixing member.

DESCRIPTION OF THE EMBODIMENTS

Hereinafter, an embodiment will be explained with reference to the drawings.

Figure 1:
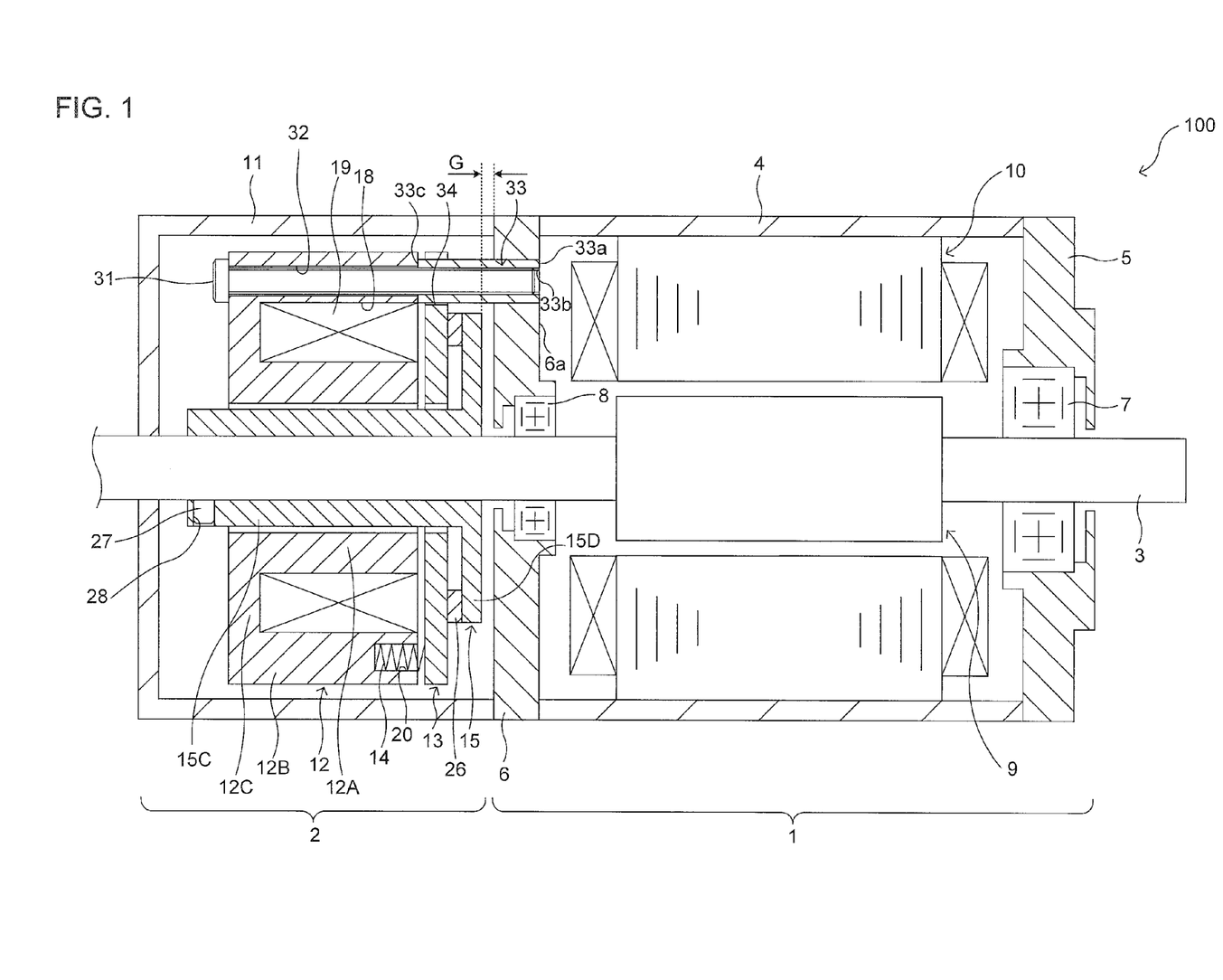
FIG. 1 is a vertical cross-sectional view showing an entire configuration of a motor in relation to an embodiment.

As shown in FIG. 1, a motor 100 in relation to the embodiment has a motor body unit 1 that outputs rotation power, and a brake unit 2. The motor body unit 1 includes a rotary shaft 3, a frame 4, a load side bracket 5 disposed on a load side (the right side in FIG. 1, the same is applied below) end of the frame 4, and an opposite load side bracket 6 disposed on an opposite load side (the side opposite to the load side, left side in FIG. 1, the same is applied below) end of the frame 4. The bracket 5, 6 includes aluminum or the like that has lightweight and good thermal conductivity. For the load side bracket 5 and the opposite load side bracket 6, there are disposed a load side bearing 7 and an opposite load side bearing 8, respectively, that rotatably support the rotary shaft 3. In the example, the load side bearing 7 is configured to have a size larger than that of the opposite load side bearing 8. Meanwhile, the opposite load side bracket 6 corresponds to an example of a housing.

Further, the motor body unit 1 has a rotor 9 disposed on the rotary shaft 3, and a stator 10 that is disposed on the inner circumference face of the frame 4 so as to be arranged radially, facing the rotor 9 via a magnetic air gap.

The brake unit 2 is fixed to the opposite load side bracket 6 of the motor body unit 1 with a bolt, and performs braking or holding of the rotary shaft 3. Meanwhile, in the embodiment, the brake unit 2 is arranged on the opposite load side of the motor body unit 1, but it may be arranged on the load side of the motor body unit 1. The brake unit 2 is covered with a brake cover 11 disposed on the opposite load side of the opposite load side bracket 6. The brake unit 2 has a cylindrical field core 12, an annular armature 13 arranged, facing the load side of the field core 12, a braking spring 14, and a brake disc 15. Meanwhile, the field core 12 corresponds to an example of a fixing member.

The field core 12 includes an inner cylindrical portion 12A, an outer cylindrical portion 12B, and a base plate portion 12C. A ring-like space in the radius direction between the inner cylindrical portion 12A and the outer cylindrical portion 12B serves as a concave portion 18 for coil that opens on one side in the cylindrical axis direction. In the concave portion 18 for a coil, a coil 19, which gives magnetic attractive force toward the opposite load side to the armature 13 in a conduction state, is housed. Meanwhile, faces of the inner cylindrical portion 12A and the outer cylindrical portion 12B on the load side (that is, the face of the field core 12 on the side facing the armature 13) serve as a magnetic pole face that attracts magnetically the armature 13. On the load side face of the outer cylindrical portion 12B, plural concave portions 20 for a spring are disposed at suitable regular spaces in a circumferential direction. In each of these concave portions 20 for a spring, the braking spring 14 is housed so as to be interposed between the field core 12 and the armature 13. These brake springs 14 apply an urging force on the armature 13 for pressing toward the load side. Furthermore, on the outer cylindrical portion 12B, through holes 32 for a bolt 31 are disposed at suitable regular spaces in a circumferential direction. The field core 12 is fixed to the opposite load side bracket 6 with plural bolts 31 via a collar 33 to be described later.

The collar 33 is a cylindrical member including, for example, non-magnetic stainless steel. The collar 33 is arranged in plural between the motor body unit 1 and the brake unit 2 and is inserted with the bolt 31, and forms a gap between the opposite load side bracket 6 and the field core 12. Each of the collars 33 is arranged in a position corresponding to the through hole 32 of the field core 12 in the circumference direction. As to each of the collars 33, the load side end is insert-molded on the opposite load side bracket 6 and fixed thereto. In the example, the load side end of the collar 33 is in a state of being inserted into the opposite load side bracket 6 so that a load side end face 33a of the collar 33 is approximately flush with an inside surface 6a of the opposite load side bracket 6. Inside the collar 33, a female screw 33b is formed, and the bolt 31 passes through the through hole 32 (no screw is formed) of the field core 12 and is screwed with the female screw 33b of the collar 33. An opposite load side end face 33c of the collar 33 butts on the magnetic pole face of the field core 12. The collar 33 having such configuration adjusts the space between the opposite load side bracket 6 and the field core 12 at a portion projecting from the opposite load side bracket 6, and secures a gap G between the brake disc 15 (in detail, a flange 15D to be described later) and the opposite load side bracket 6. Further, it engages with a notch 34 formed in the outer circumference portion of the armature 13 to prevent the rotation of the armature 13.

The armature 13 includes a magnetic body (a steel plate or the like), and is supported movably relative to the field core 12 in the shaft direction of the rotary shaft 3. The armature 13 is pressed to the load side by a spring force of the braking spring 14, and is engaged frictionally with the opposite load side face of the brake disc 15 (in detail, a flange 15D to be described later) via a friction plate 26 to be described later. Further, in the outer circumference portion in the radius direction of the armature 13, plural notches 34 to engage with the collar 33 are formed.

The brake disc 15 has a cylindrical boss portion 15C that passes through the central portion of the armature 13 and the field core 12, and a flange 15D disposed on the load side end of the boss portion 15C. To the face on the opposite load side on the outer circumference side in the flange 15D (the face on the side facing the armature 13), a ring-like friction plate 26 is attached. The boss portion 15C is formed in a length so that the opposite load side end projects from the field core 12, and, on the outer circumference face of the projecting portion, a screw hole 28 for a fixing screw 27 is disposed. With the fixing screw 27, the brake disc 15 is fixed to the rotary shaft 3.

In the brake unit 2, in a state where the coil 19 is not applied with power (non-excited state), the armature 13 is pressed toward the load side by the spring force of the braking spring 14 and the armature 13 engages frictionally with the brake disc 15 via the friction plate 26. The armature 13 is configured not to rotate at this time by the engagement of the collar 33 with the notch 34 of the armature 13. As the result, the brake disc 15 is braked and the rotation of the rotary shaft 3 is braked. As described above, the brake unit 2 causes the rotary shaft 3 in the inertial rotation to stop moving, or, when force for rotation is applied from an outside to the rotary shaft 3 that is at rest, maintains the state of rest of the rotary shaft 3 by holding the rotary shaft 3. On the other hand, when the coil 19 is in a conduction state (excited state), since the coil 19 gives magnetic attractive force to the armature 13 toward the opposite load side, the armature 13 moves to the opposite load side while resisting the spring force of the braking spring 14. As the result, the brake disc 15 is released from the braking and the rotary shaft 3 becomes rotatable.

Here, before explaining the effect of the embodiment that has been explained above, Comparative Example for explaining the effect of the embodiment will be explained below.

Figure 2:
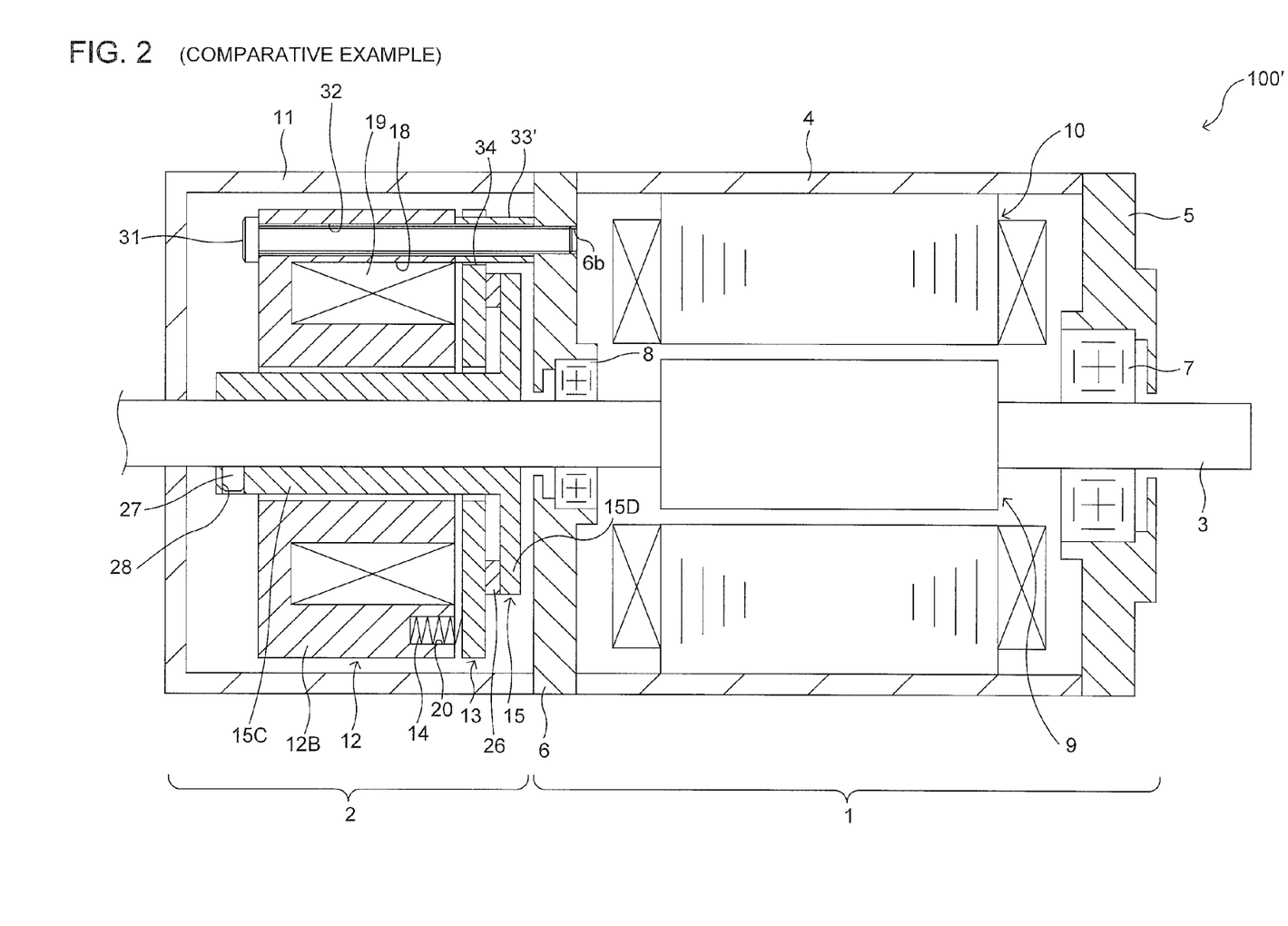
FIG. 2 is a vertical cross-sectional view showing an entire configuration of a motor in relation to Comparative Example.

As shown in FIG. 2, in a motor 100' in relation to Comparative Example, points different from a motor 100 in relation to the embodiment are a point in which a collar 33' is included instead of the collar 33, and a point in which the opposite load side bracket 6 includes a screw hole 6b for the bolt 31. The collar 33' does not have a configuration in which the end thereof is inserted into the opposite load side bracket 6, differing from the collar 33, but is disposed, being interposed between the opposite load side bracket 6 and the field core 12. Further, no female screw is formed inside the collar 33', but the bolt 31 passes through the through hole 32 of the field core 12 and the collar 33', and is screwed into the screw hole 6b of the opposite load side bracket 6. The other configurations are the same as those of the embodiment. Meanwhile, in FIG. 2, the same symbols are attached to the same structures as those in FIG. 1.

In the motor 100' of the above configuration, the attaching work of the brake is performed by a following procedure. Meanwhile, in the brake unit 2, the field core 12, the armature 13 and the brake disc 15 are built up integrally with a fixing member which is not illustrated, before the attaching to the motor body unit 1. The fixing member is a member for building up integrally the field core 12, the armature 13 and the brake disc 15, while adjusting the space between the armature 13 and the field core 12, by being fixed to the boss portion 15C of the brake disc 15 in the state of abutting on the face of the field core 12 on the opposite load side.

When attaching the brake unit 2 built up integrally by the fixing member to the motor body unit 1, first, the collar 33' is arranged on the screw hole 6b of the opposite load side bracket 6, in a state where the opposite load side of the motor body unit 1 is directed upward. Next, after applying an adhesive onto the boss portion 15C of the brake disc 15, the rotary shaft 3 is inserted, and the brake unit 2 is attached to the motor body unit 1 so that the collar 33' goes through the notch 34 of the armature 13. Then, the bolt 31 is caused to pass through the through hole 32 of the field core 12 and the collar 33', and is tightened to the screw hole 6b of the opposite load side bracket 6 to fix the field core 12 to the opposite load side bracket 6. Subsequently, the brake disc 15 is fixed to the rotary shaft 3 with a fixing screw 27, and the fixing member is removed.

As described above, in the brake attaching work of the motor 100' in Comparative Example, the attaching of the brake unit 2 is performed in a state where the collar 33' is simply placed on the opposite load side bracket 6 and, therefore, there is a problem of poor workability, because the armature 13 or the like may contact with the collar 33' on the opposite load side bracket 6 to generate the falling down or falling off of the collar 33'.

In contrast, in the motor 100 of the embodiment shown in FIG. 1, although the brake attaching work is performed in the same procedure as above, since it is configured so that the end of the collar 33 is inserted into the opposite load side bracket 6, the generation of the falling down or falling off of the collar 33 can be prevented in the attaching work of the brake unit 2. Accordingly, the workability in the brake attaching can be improved.

Meanwhile, in order to prevent the falling down or falling off of the collar 33, molding integrally the opposite load side bracket 6 and the collar 33 with the same material will be considered, but, since the bracket 5, 6 of the motor 100 is configured with aluminum or the like that has lightweight and good thermal conductivity as described above, the collar 33 is to be of the same material. However, on the collar 33, the rotation power of the armature 13 engaging frictionally with the brake disc 15 acts, and tensile force by the spring force of the braking spring 14 also acts in the brake operation, and, therefore, high strength is necessary and the strength may be insufficient in the case of aluminum or the like. On the other hand, in order to dissolve the insufficient strength, when the collar 33 and the opposite load side bracket 6 are molded integrally with stainless steel or the like having large strength, the opposite load side bracket 6 is to be made of stainless steel, which has thermal conductivity lower than that of aluminum or the like and has larger weight. Therefore, heat radiating property of the motor 100 deteriorates and the weight increases.

In the embodiment, since the opposite load side bracket 6 and the collar 33 are set to be independent bodies and, then, an inserted configuration is adopted, each can include a suitable material and the workability in the brake attaching can be improved. That is, when causing the bracket 5, 6 to include aluminum or the like and the collar 33 to include non-magnetic stainless steel or the like, the weight reduction of the motor can be achieved with good heat radiating property, and the strength of the collar 33 can be secured sufficiently.

Meanwhile, in order to prevent the falling down or falling off of the collar, a configuration, in which a collar itself is not disposed, is also considered. Specifically, a configuration, in which a flange is disposed in the outer circumference portion of the field core and is attached to a projection disposed on the opposite load side bracket thereby to secure the gap between the field core and the opposite load side bracket according to the height of the projection, etc., are considered. In this case, since the projection is arranged in the outer circumference of the field core, it becomes possible to widen the outer diameter of the brake disc up to the vicinity of the outer circumference of the field core, and, since the rotation radius of the friction face increases, such an effect that brake torque can be increased (when brake torque is set to be similar to that in the past, the size of the brake can be reduced because of the reduction of the field core) can be expected. In the configuration, since no collar is disposed, it is necessary to achieve the prevention of rotation of the armature by inserting a pin or the like into the armature and the field core. However, the pin or the like has lower strength as compared with the collar, and, since it is considered to be disposed on an inner circumference side as compared with the collar, the holding power of the armature may become insufficient. In particular, as the size of a motor becomes larger, the brake torque also increases, and, therefore, the insufficiency of holding power of the armature is concerned.

In the embodiment, since the collar 33 is disposed, and, in addition, the collar 33 includes non-magnetic stainless steel or the like to secure the strength sufficiently, the rotation of the armature in brake operation can be prevented reliably even in a motor of a large size. Accordingly, the motor 100 with high reliability on the brake can be actualized.

Further, in the embodiment in particular, the collar 33 is insert-molded on the opposite load side bracket 6 and the collar 33 and the opposite load side bracket 6 are configured integrally. Consequently, a work of arranging the collar 33 on the opposite load side bracket 6 in attaching the brake unit 2 becomes unnecessary and a man-hour can be reduced. Further, by insert-molding the collar 33 on the opposite load side bracket 6, as compared with the structure in Comparative Example in which the collar 33' is arranged on the bracket 6 as shown in FIG. 2, the contact area between the collar 33 and the opposite load side bracket 6 can be increased. Consequently, heat generated on the motor body unit 1 side can easily be transmitted to the brake unit 2 side via heat conduction between the opposite load side bracket 6 and the collar 33, and the heat radiation property of the motor 100 can be improved.

Further, in the embodiment in particular, the female screw 33b is formed inside the collar 33 and the field core attaching bolt 31 is screwed into the female screw 33b of the collar 33. Consequently, as compared with the structure in Comparative Example shown in FIG. 2, the tightening length of the bolt 31 (in the embodiment, it is approximately the same as the length of the collar 33, but, in Comparative Example, it is approximately the same as the thickness of the bracket 6) can be increased, and the bolt can be tightened to the collar 33 including stainless steel or the like having strength larger than the bracket 6 including aluminum or the like. Accordingly, it becomes possible to increase the tightening force significantly by the bolt 31 and the attaching stability of the brake unit 2 can be improved significantly. Meanwhile, in the embodiment, the length of the bolt 31 is set to be the same length as that in Comparative Example, but, when designing the tightening force to be the same degree as that in Comparative Example, it is sufficient to cause the bolt 31 to be screwed into a part of the portion projecting from the bracket 6 in the collar 33. In this case, the bolt 31 may be shortened as compared with Comparative Example. Accordingly, the embodiment can contribute to size reduction of parts and reduction of the motor weight.

Further, in the embodiment in particular, the collar 33 includes non-magnetic stainless steel or the like. Consequently, while maintaining sufficiently the strength of the collar 33, no influence is given to the motion of the armature 13 being a magnetic body. Accordingly, the motor 100 with high reliability can be actualized.

The structure that the end of the collar 33 is inserted into the opposite load side bracket 6 corresponds to an example of means for preventing the collar from falling down in attaching the brake to the motor body described in claims.

Meanwhile, the embodiment is not limited to the above contents, but various modifications are possible in the range that does not deviate from the gist and the technical idea thereof. Hereinafter, such modified examples will be explained in order.

(1) Case of Disposing Flange for Collar

On the collar 33, since a tensile force by the spring force of the braking spring 14 acts in brake operation, the prevention of the collar 33 from falling off may be attempted. An example is shown in FIG. 3 and FIGS. 4A and 4B.

Figure 3:
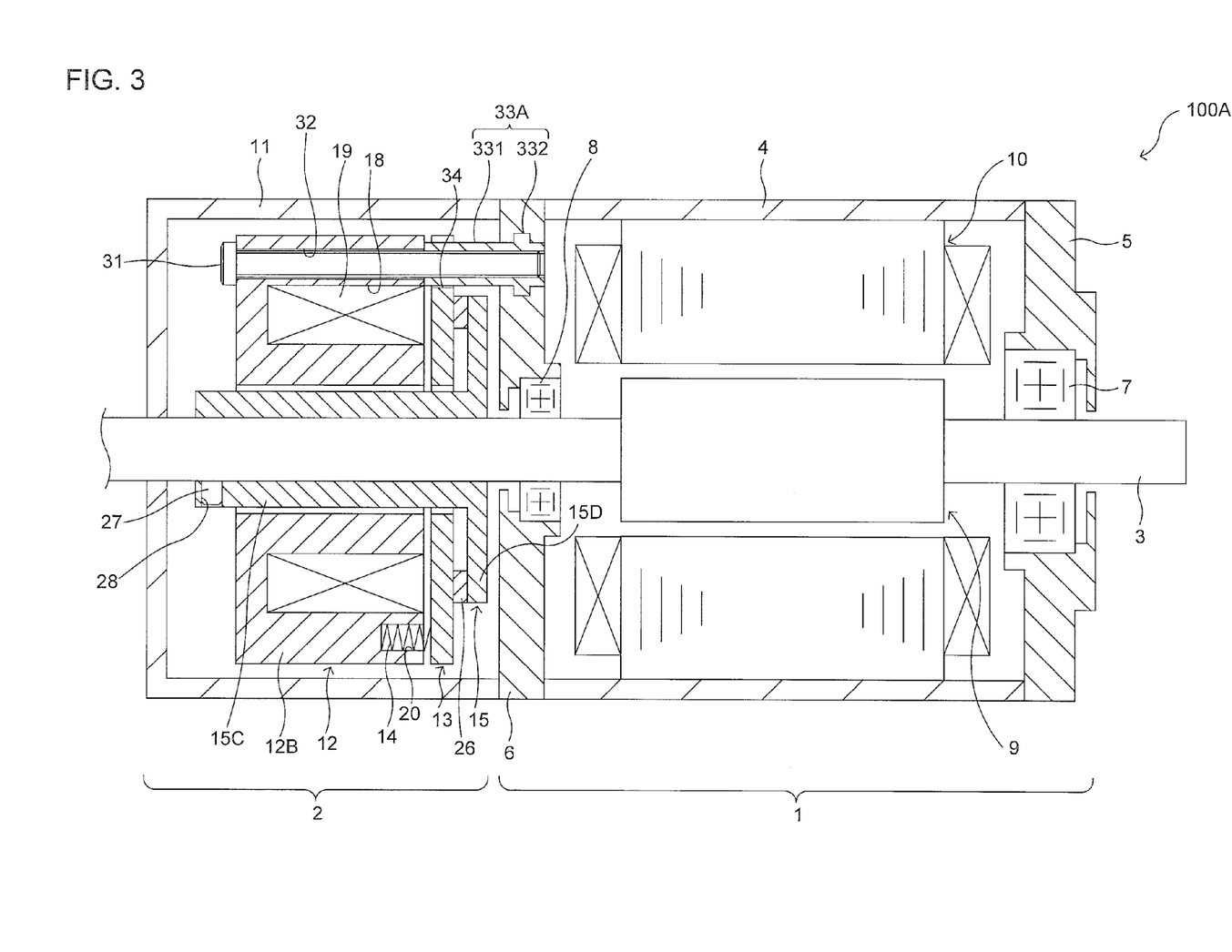
FIG. 3 is a vertical cross-sectional view showing an entire configuration of a motor in relation to a modified example in which a flange is disposed in a collar.
Figure 4A:
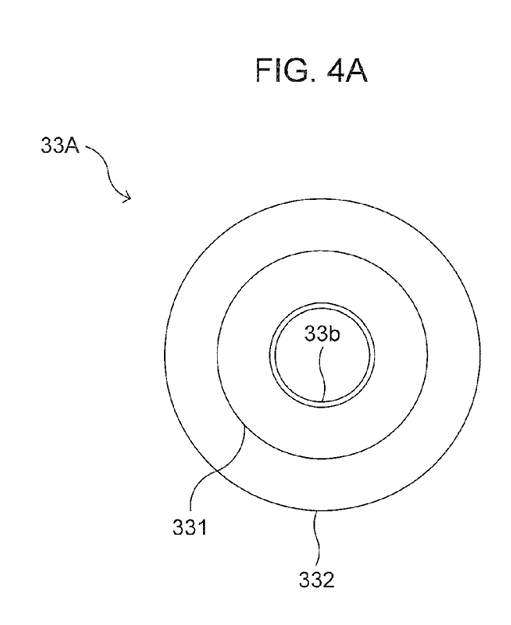
FIG. 4A is a front view showing an entire configuration of the collar with the flange.
Figure 4B:
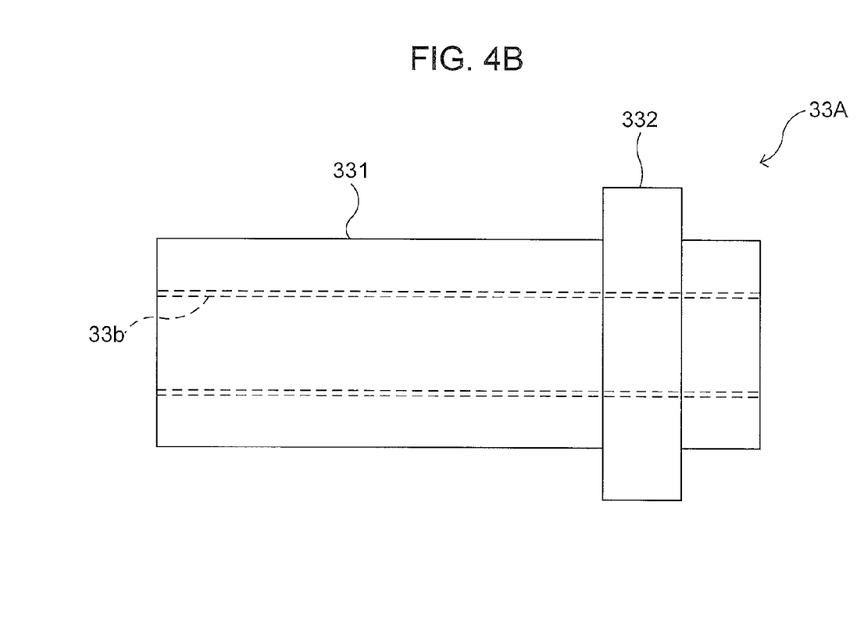
FIG. 4B is a side view showing an entire configuration of the collar with the flange.

As shown in FIG. 3 and FIGS. 4A and 4B, a collar 33A of the modified example has a cylindrical collar body portion 331 with a female screw 33b formed inside, and a flange 332 disposed in the outer circumference of the collar body portion 331. The flange 332 is formed with an outer diameter larger than that of other parts of the collar body portion 331, and is disposed on a part to be inserted into the opposite load side bracket 6 in the insert-molding of the collar 33A. Configurations other than the collar 33A are the same as those in the embodiment. Meanwhile, in the example, the flange 332 is disposed continuously over a round of the outer circumference face of the collar body portion 331, but it may be disposed partially or discontinuously in the circumference direction.

According to the modified example, since the falling down or falling off of the collar 33A from the opposite load side bracket 6 can be prevented, the attaching stability of the brake can be improved further.

(2) Case of Disposing Protruding Portion or D Cut Portion for Collar

Since the rotation power acts on the collar 33 in fastening the bolt 31, a rotation preventing structure may be disposed on the collar 33. In FIGS. 5A and 5B and FIGS. 6A and 6B, an example of the rotation preventing structure is shown.

Figure 5A:
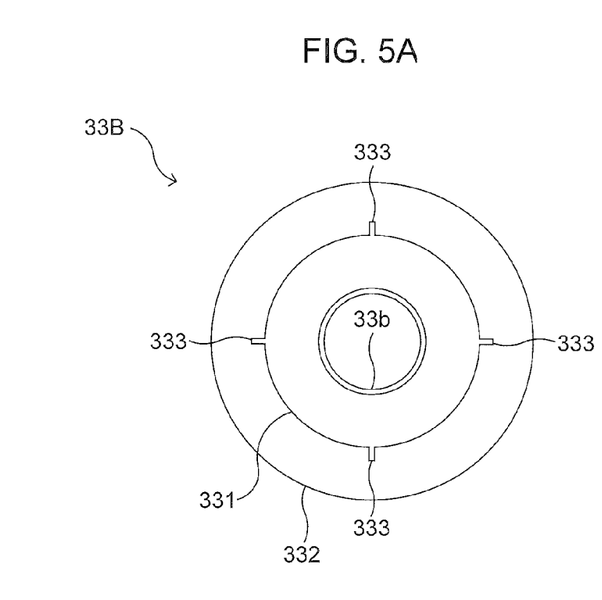
FIG. 5A is a front view showing an entire configuration of the collar with a protruding portion.
Figure 5B:
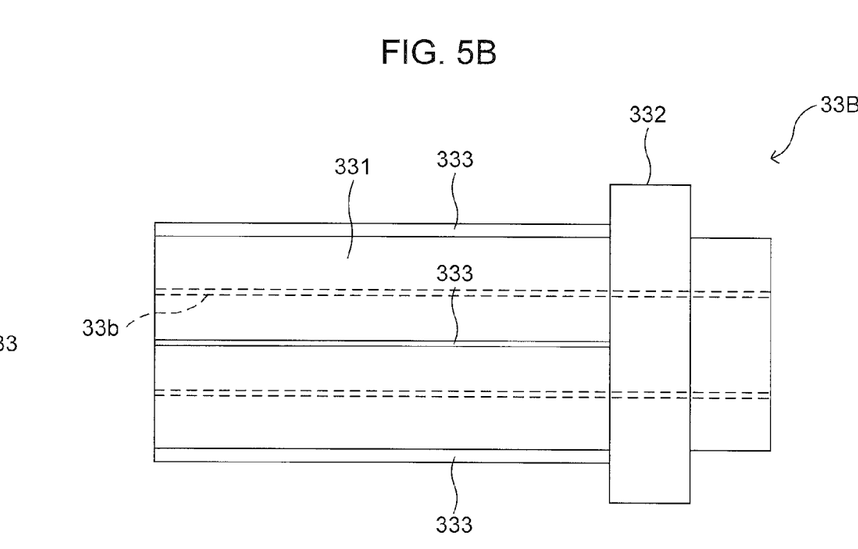
FIG. 5B is a side view showing an entire configuration of the collar with a protruding portion.

In the example shown in FIGS. 5A and 5B, a collar 33B has the cylindrical collar body portion 331 with the female screw 33b formed inside, the flange 332, and plural (four in the example) protruding portions 333 disposed on the outer circumference face of the collar body portion 331, extending along a cylindrical axis direction (in FIG. 5B, the right-left direction). Each of the protruding portions 333 projects from the outer circumference face of the collar body portion 331 toward the outside in the diameter direction, and the shape of cross-section (cross-section in the axis direction) thereof is approximately rectangular. Further, each of the protruding portions 333 is disposed at approximately 90-degree intervals in the circumference direction. As the result that these protruding portions 333 engage with the opposite load side bracket 6, the rotation of the collar 33B can be prevented. Meanwhile, in the example, the protruding portion 333 is disposed only on one side of the flange 332 (in FIG. 5B, the left side), but it may be disposed on both sides of the flange 332. Further, the number of the protruding portions 333 is not limited to four, but may be more than one, and the cross-sectional shape thereof is not limited to a rectangle but may be a triangle, an ellipsoid, or the like. Further, without disposing the flange 332 on the outer circumference face of the collar body portion 331, the protruding portion 333 may be disposed over the entire cylindrical axis direction.

Figure 6A:
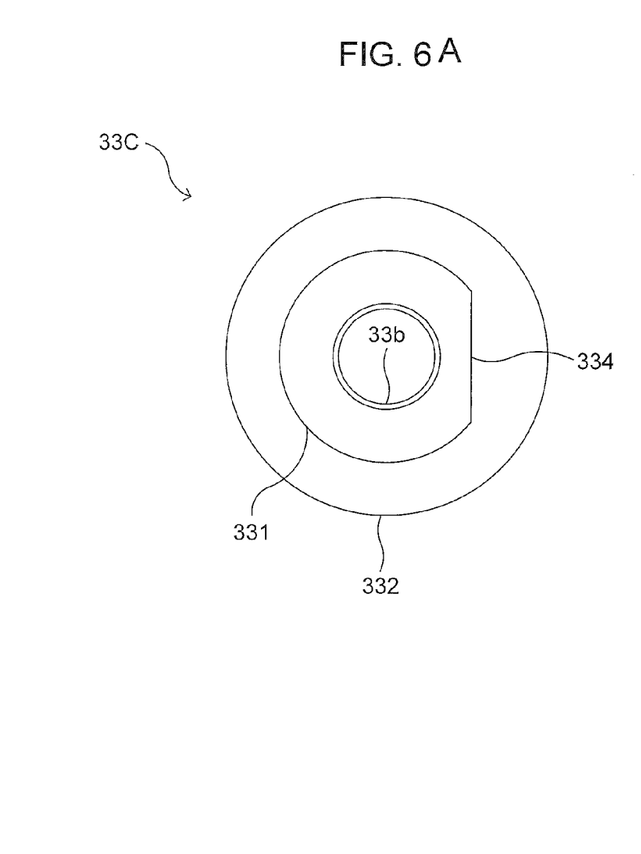
FIG. 6A is a front view showing the entire configuration of a collar with a D cut portion.
Figure 6B:
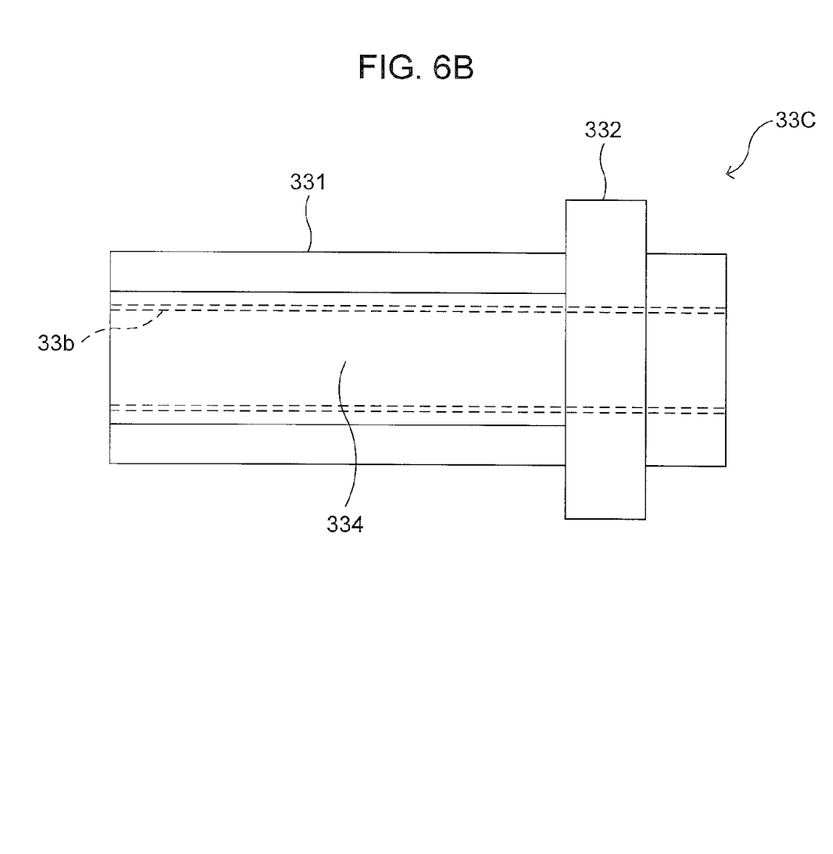
FIG. 6B is a side view showing the entire configuration of a collar with a D cut portion.

In the example shown in FIGS. 6A and 6B, the collar 33C has the cylindrical collar body portion 331 with the female screw 33b formed inside, the flange 332, and the D cut portion 334 disposed on the outer circumference face of the collar body portion 331. As the result that the D cut portion 334 engages with the opposite load side bracket 6, the rotation of the collar 33C can be prevented. Meanwhile, in the example, the D cut portion 334 is disposed only on one side of the flange 332 (in FIG. 6B, the left side), but it may be disposed on both sides of the flange 332. Further, without disposing the flange 332 on the outer circumference face of the collar body portion 331, the D cut portion 334 may be disposed over the entire cylindrical axis direction.

According to the modified example, by disposing the protruding portion 333 or the D cut portion 334 on the outer circumference face of the collar 33B, 33C, the rotation of the collar 33B, 33C relative to the opposite load side bracket 6 in fastening a bolt can be prevented. Therefore, it becomes possible to fasten sufficiently the bolt 31 and the attaching stability of the brake can be improved further.

(3) Case of Insert-Molding Collar on Field Core

In the embodiment, the collar is insert-molded on the opposite load side bracket side, but it may be insert-molded on the field core side.

Figure 7:
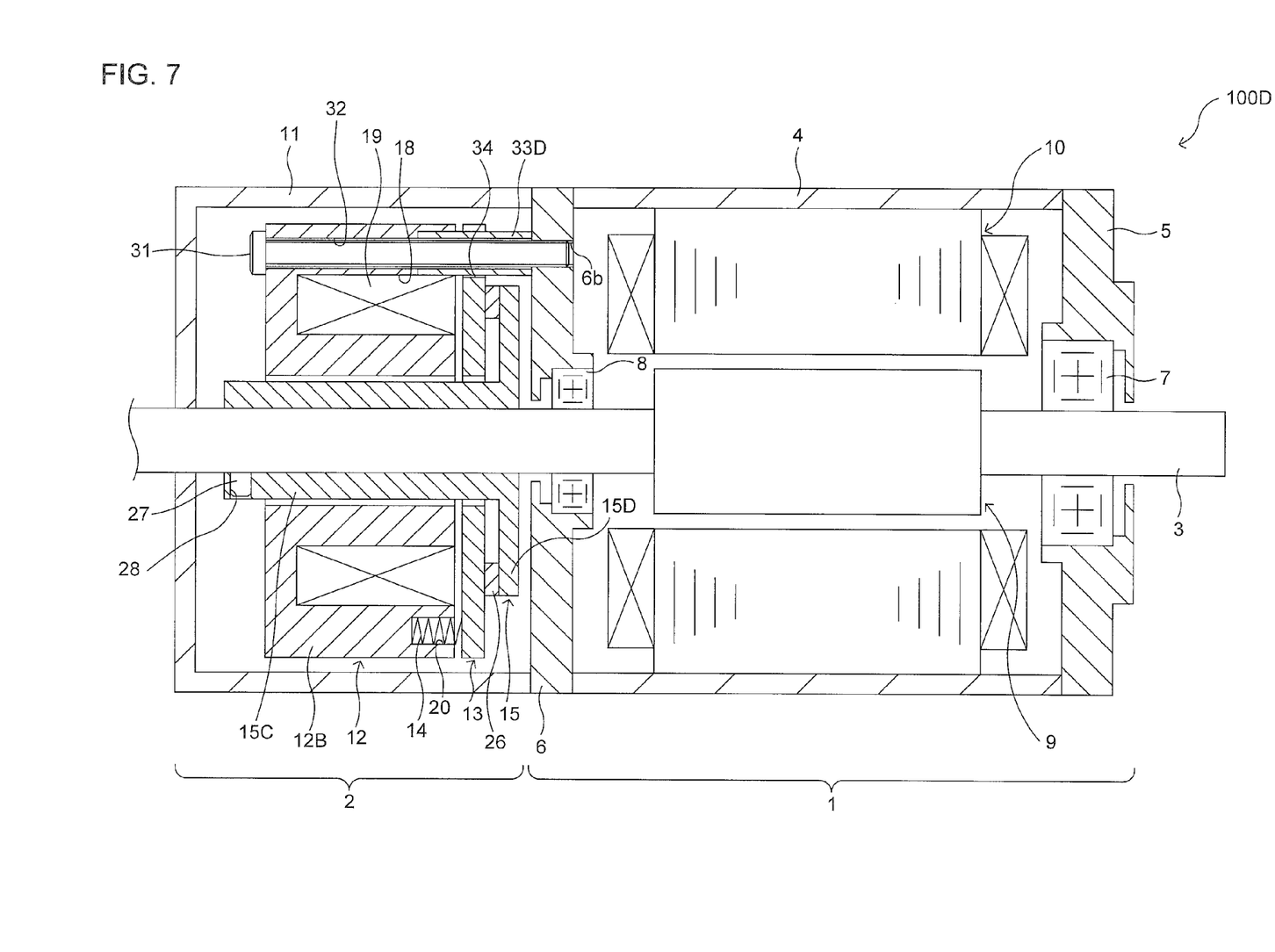
FIG. 7 is a vertical cross-sectional view showing the entire configuration of a motor in relation to a modified example in which the collar is insert-molded on a field core.

As shown in FIG. 7, in a motor 100D of the modified example, the opposite load side end of a collar 33D is insert-molded on the field core 12 and fixed thereto. The collar 33D includes non-magnetic stainless steel or the like as is the case for the collar 33, but, differing from the collar 33, no female screw is formed inside. That is, the bolt 31 passes through the through hole 32 of the field core 12 and the collar 33D, and is screwed into the screw hole 6b of the opposite load side bracket 6. Other configurations are the same as those in the embodiment.

In the modified example, since such a configuration is adopted that the end of the collar 33D is inserted into the field core 12, the generation of the falling down or falling off of the collar 33D in the attaching work of the brake unit 2 can be prevented. Accordingly, workability in attaching a brake can be improved. Further, a work of arranging the collar 33D on the opposite load side bracket 6 (or on the field core 12) becomes unnecessary in attaching the brake and a man-hour can be reduced.

Furthermore, the surface of the opposite load side bracket 6 on the brake unit 2 side is occasionally subjected to a flattening processing in order to make the gap between the opposite load side bracket 6 and the brake disc 15 (for achieving size reduction of the motor 100D in the axis direction) minute, but, when the collar 33D is molded integrally on the opposite load side bracket 6 side, the processing cannot be performed. In the modified example, since the collar 33D is molded integrally on the field core 12 side, the surface processing of the opposite load side bracket 6 can be performed, and the size reduction of the motor 100D can be achieved.

Meanwhile, it is considered to mold integrally the field core 12 and the collar 33D with the same material in order to prevent the falling down or falling off of the collar 33D, but, in the case, since the field core 12 includes a magnetic body, the collar 33D also includes a magnetic body, which may influence on the motion of the armature 13 located in the vicinity. In the modified example, since such a configuration is adopted that the field core 12 is set to be an independent body from the collar 33D and then is inserted. Therefore, when the collar 33D includes a non-magnetic body (non-magnetic stainless steel or the like), it gives no influence on the motion of the armature 13 being a magnetic body.

Figure 8:
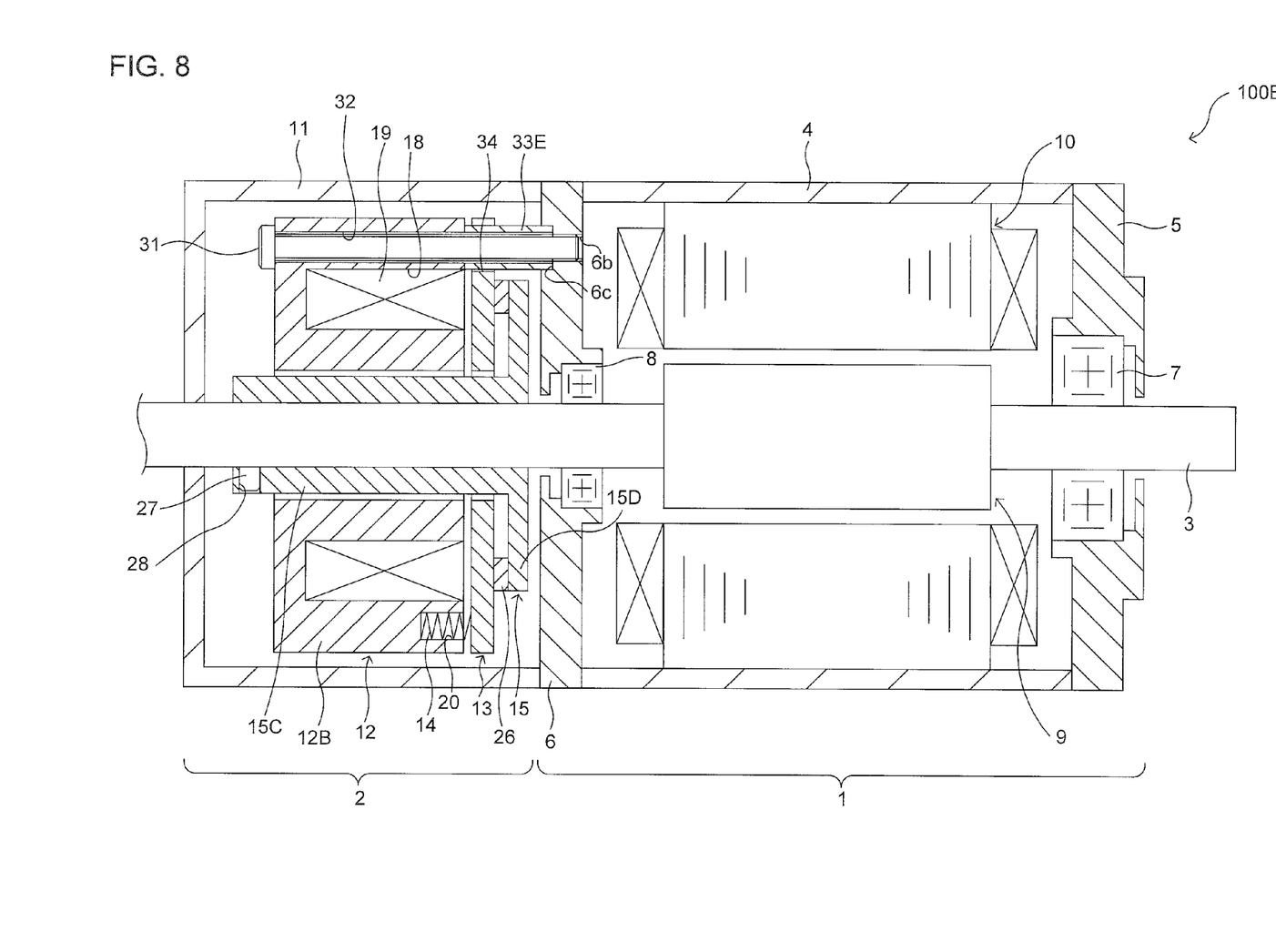
FIG. 8 is a vertical cross-sectional view showing the entire configuration of a motor in relation to a modified example in which the collar is inserted into a concave portion of an opposite load side bracket.

(4) Case of such Configuration that Collar is Inserted into Bracket or Concave Portion of Field Core In the embodiment, the collar 33 is insert-molded on the opposite load side bracket 6 and fixed, but the collar 33 is not necessarily to be fixed. For example, a concave portion for inserting the collar is disposed on at least one of the opposite load side bracket 6 and the field core 12, and then the collar may be inserted into the concave portion in attaching a brake. In FIG. 8, an example is shown.

In the example shown in FIG. 8, a concave portion 6c is disposed on the surface of a part on brake side corresponding to the screw hole 6b of the opposite load side bracket 6. In the concave portion 6c, a collar 33E has been inserted. The concave portion 6c and the collar 33E are not fixed in particular, but may be fixed with an adhesive or the like. In the modified example, the collar 33E is inserted into the concave portion 6c of the opposite load side bracket 6 in attaching a brake. At this time, an adhesive may be applied to the concave portion 6c. Subsequently, the brake unit 2 is attached to the motor body unit 1.

In the modified example, too, since such a configuration is adopted that the end of the collar 33E has been inserted into the opposite load side bracket 6, such probability that the falling down or falling off of the collar 33 is generated in the attaching work of the brake unit 2 can be reduced. Accordingly, workability in attaching a brake can be improved.

Meanwhile, in the description, the concave portion 6c is disposed on the opposite load side bracket 6, but a concave portion may be disposed on the field core 12, or a concave portion may be disposed on both the opposite load side bracket 6 and the field core 12.

(5) Others

The brake unit 2 explained in the embodiment is an example, and the structure of the brake is not limited to this. The disclosure may be applied irrespective of the shape and type of a brake, only if it is one which is fixed to the housing of the motor body unit with a bolt and forms a gap between the housing of the motor body unit and the fixing member of the brake unit with a collar.

Further, in addition to matters described above, techniques by the embodiment and each of the modified examples may be combined suitably and utilized.

In addition, although not exemplified point by point, the embodiment and each of the modified examples will be brought into practice after the addition of various changes in the range that does not deviate from the purport thereof.

What is claimed is:

1. A motor comprising:
   a motor body unit configured to output rotation power;
   a brake unit fixed to a housing of the motor body unit with a bolt; and
   a collar arranged between the motor body unit and the brake unit, in which the bolt is inserted, the collar forming a space between the housing of the motor body unit and a fixing member of the brake unit,
the collar is fixed with its end portion on the housing side being insert-molded in the housing in a manner such that an end face on the housing side of the collar is approximately flush with an inside surface of the housing.

2. The motor according to claim 1, wherein
the motor body unit comprises
a rotor disposed on a rotary shaft,
a stator arranged to face the rotor in a radius direction via a magnetic air gap, and
the housing in which a bearing supporting the rotary shaft is disposed, and
the brake unit comprises
a field core as the fixing member fixed to the housing with the bolt, the field core housing a coil,
an armature supported movably relative to the field core in a shaft direction of the rotary shaft, the armature comprising a notch engaging with the collar on an outer circumference portion, and
a brake disc fixed to the rotary shaft, the brake disc being configured to engage frictionally with the armature.

3. The motor according to claim 2, wherein:
the collar comprises a flange in an insertion portion into the housing.

4. The motor according to claim 3, wherein:
a female screw into which the bolt is screwed is formed inside the collar.

5. The motor according to claim 4, wherein:
the collar comprises a rotation preventing structure preventing rotation relative to the housing.

6. The motor according to claim 2, wherein:
a female screw into which the bolt is screwed is formed inside the collar.

7. The motor according to claim 6, wherein:
the collar comprises a rotation preventing structure preventing rotation relative to the housing.

8. The motor according to claim 1, wherein:
the collar comprises a flange in an insertion portion into the housing.

9. The motor according to claim 8, wherein:
a female screw into which the bolt is screwed is formed inside the collar.

10. The motor according to claim 9, wherein:
the collar comprises a rotation preventing structure preventing rotation relative to the housing.

11. The motor according to claim 1, wherein:
a female screw into which the bolt is screwed is formed inside the collar.

12. The motor according to claim 11, wherein:
the collar comprises a rotation preventing structure preventing rotation relative to the housing.

13. The motor according to claim 1, wherein:
the collar is a cylindrical member, a female screw into which the bolt is screwed is formed inside the collar over an entire cylindrical axis direction of the collar.

* * * * *